(12) United States Patent
Takata

(10) Patent No.: US 10,363,816 B2
(45) Date of Patent: Jul. 30, 2019

(54) PEDAL UNIT AND A VEHICLE INCLUDING THE SAME

(71) Applicant: YAMAHA HATSUDOKI KABUSHIKI KAISHA, Iwata-shi, Shizuoka (JP)

(72) Inventor: Kazunari Takata, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 314 days.

(21) Appl. No.: 15/208,733

(22) Filed: Jul. 13, 2016

(65) Prior Publication Data
US 2017/0015196 A1 Jan. 19, 2017

(30) Foreign Application Priority Data

Jul. 14, 2015 (JP) ................. 2015-140606

(51) Int. Cl.
*B60K 26/02* (2006.01)
*B60T 7/06* (2006.01)
*G05G 1/36* (2008.04)
*B60T 11/16* (2006.01)

(52) U.S. Cl.
CPC ............. *B60K 26/02* (2013.01); *B60T 7/06* (2013.01); *B60T 11/165* (2013.01); *G05G 1/36* (2013.01); *B60Y 2200/20* (2013.01); *B60Y 2300/433* (2013.01); *B60Y 2300/436* (2013.01); *B60Y 2304/01* (2013.01)

(58) Field of Classification Search
CPC .. B60K 26/02; B60T 7/04; B60T 7/06; G05G 1/30; G05G 1/36
See application file for complete search history.

(56) References Cited

U.S. PATENT DOCUMENTS 4,278,143 A * 7/1981 Nagai .................... B60T 7/045
180/282
6,151,984 A * 11/2000 Johansson .............. G05G 1/323
180/334
(Continued)

FOREIGN PATENT DOCUMENTS

JP 2002-082727 A 3/2002
JP 2003-165426 A 6/2003

OTHER PUBLICATIONS

2011 Polaris 900 Review and test ride. [Retrieved online May 18, 2012]. Retrieved from <URL: https://web.archive.org/web/20120518175745/http://www.atvriders.com/atvreviews/polaris-2011-ranger-rzr-xp-900-sxs-utv-test-ride-review-p2.html> (Year: 2012).*

*Primary Examiner* — Barry Gooden, Jr.
(74) *Attorney, Agent, or Firm* — Keating and Bennett, LLP

(57) ABSTRACT

A pedal unit includes an accelerator pedal, a brake pedal, a first bracket, a second bracket, and a connector. The first bracket includes a first plate including a first surface and a second surface that rotatably supports the accelerator pedal disposed adjacent to the first surface and the brake pedal disposed adjacent to the second surface. The second bracket includes a second plate including a third surface that rotatably supports the brake pedal disposed adjacent to the third surface of the second plate. The connector connects the first bracket, the brake pedal, and the second bracket in a state in which the brake pedal is disposed between the second surface and the third surface.

26 Claims, 15 Drawing Sheets

(56) References Cited

U.S. PATENT DOCUMENTS

| | | | | |
|---|---|---|---|---|
| 6,324,939 B1 * | 12/2001 | Cicotte | ............... | G05G 1/405 74/512 |
| 6,443,028 B1 * | 9/2002 | Brock | ............... | G05G 1/405 74/512 |
| 6,491,147 B1 * | 12/2002 | Kargilis | ............... | B60K 23/02 192/13 R |
| 6,802,232 B2 * | 10/2004 | Buckley | ............... | B60K 26/02 74/512 |
| 6,907,963 B1 * | 6/2005 | Brown | ............... | B60T 1/065 188/73.31 |
| 7,191,680 B2 * | 3/2007 | Rixon | ............... | G05G 1/405 74/512 |
| 7,270,028 B2 * | 9/2007 | Rixon | ............... | G05G 1/36 74/512 |
| 8,770,616 B1 * | 7/2014 | Draper | ............... | B60N 3/066 280/728.1 |
| 9,120,375 B2 * | 9/2015 | Byun | ............... | B60K 26/00 |
| 2001/0054325 A1 | 12/2001 | Baumann et al. | | |
| 2003/0121356 A1 * | 7/2003 | Rixon | ............... | G05G 1/405 74/512 |
| 2003/0140726 A1 * | 7/2003 | Burgstaler | ............... | B60T 7/065 74/512 |
| 2003/0164057 A1 * | 9/2003 | Buckley | ............... | B60K 26/02 74/512 |
| 2004/0250646 A1 * | 12/2004 | Smith | ............... | G05G 1/405 74/512 |
| 2005/0166702 A1 * | 8/2005 | Rixon | ............... | G05G 1/36 74/512 |
| 2014/0343814 A1 * | 11/2014 | Byun | ............... | B60K 26/00 701/70 |
| 2015/0107401 A1 * | 4/2015 | Farrell | ............... | B60T 7/042 74/512 |
| 2017/0043662 A1 * | 2/2017 | Perusic | ............... | B60T 7/06 |
| 2019/0111782 A1 * | 4/2019 | Mitani | ............... | B60K 20/02 |

* cited by examiner

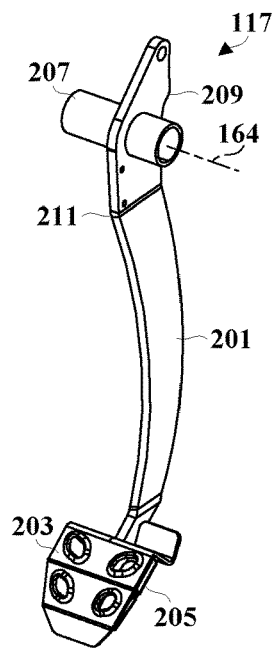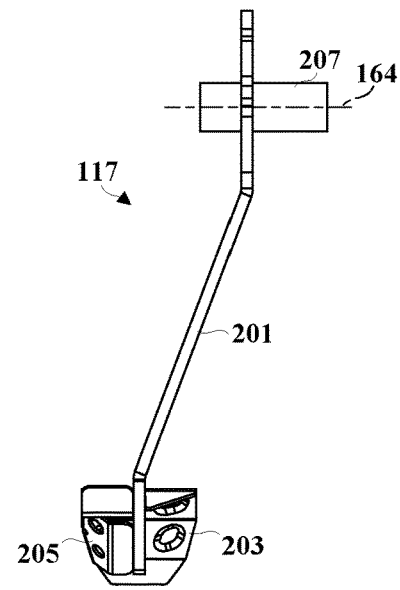
FIG. 13A    FIG. 13B
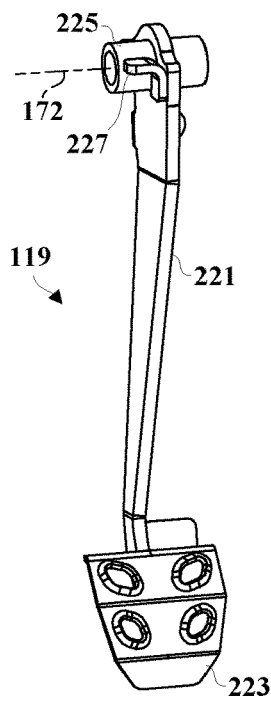
Fig.14

PEDAL UNIT AND A VEHICLE INCLUDING THE SAME

BACKGROUND OF THE INVENTION

1. Field of the Invention

The present invention relates to a pedal unit and a vehicle including the same.

2. Description of the Related Art

Conventionally, an ordinary passenger vehicle for traveling on level ground includes an accelerator pedal and a brake pedal. The accelerator pedal and brake pedal are assembled to a body frame or the like in a space forward of the feet of a driver so as to be operable by a foot of the driver.

Examples of an accelerator pedal and a brake pedal unitized into a pedal unit are described in Japanese Unexamined Patent Publication No. 2002-82727 and Japanese Unexamined Patent Publication No. 2003-165426. By unitizing these pedals, the pedals can be assembled to a vehicle body with improved efficiency. With an ordinary passenger vehicle, a large space can be secured at the driver's feet, and a pedal unit that is large in a width direction can therefore be assembled.

Japanese Unexamined Patent Publication No. 2002-82727 describes a pedal unit including an accelerator pedal, a brake pedal, and a clutch pedal attached to a common wide assembly plate. Japanese Unexamined Patent Publication No. 2003-165426 similarly describes a pedal unit including an accelerator pedal, a brake pedal, and a clutch pedal attached to a common wide pedal bracket.

An ROV (Recreational Off-Highway Vehicle) including a roll cage is known as a vehicle suitable for traveling on uneven ground that is distinct from an ordinary passenger vehicle. Such a vehicle includes a body frame and the like arranged forward of a driver's seat, and a flat space is not provided at the foot of the driver's seat unlike the case with the ordinary passenger vehicle. That is, there is no space sufficient to secure a flat surface to mount a plate-shaped bracket as provided in the ordinary passenger vehicle. It is therefore difficult for an ROV to use a structure as described in Japanese Unexamined Patent Publication No. 2002-82727 or Japanese Unexamined Patent Publication No. 2003-165426, and it is difficult to assemble a pedal unit to the ROV.

SUMMARY OF THE INVENTION

Preferred embodiments of the present invention provide a pedal unit that is attachable in a space-saving manner, and a vehicle including such a pedal unit.

According to a preferred embodiment of the present invention, a pedal unit includes an accelerator pedal rotatable about a first pivot axis; a brake pedal rotatable about a second pivot axis; a first bracket including a first plate including a first surface and a second surface on a side opposite to the first surface and that supports the accelerator pedal adjacent to the first surface of the first plate to be rotatable about the first pivot axis, and that supports the brake pedal adjacent to the second surface of the first plate to be rotatable about the second pivot axis; a second bracket including a second plate including a third surface opposing the second surface and that supports the brake pedal adjacent to the third surface of the second plate to be rotatable about the second pivot axis; and a connector that connects the first bracket, the brake pedal, and the second bracket in a state in which the brake pedal is disposed between the second surface of the first bracket and the third surface of the second bracket.

According to a preferred embodiment of the present invention, the accelerator pedal and brake pedal are attached to the plates extending in a fore-and-aft direction, and not to plates extending in a width direction. The respective pedals are therefore supported by the first surface and the second surface of the first plate and the third surface of the second plate. Consequently, a right-left support range for the two pedals is compact without necessitating an extra space in the width direction. The brake pedal, which is heavily subjected to both oil pressure and a weight load, is supported by both the first bracket and the second bracket.

Preferably, the first surface of the first plate includes a surface that extends vertically or substantially vertically relative to the first pivot axis. Since the first surface of the first plate includes a surface extending vertically or substantially vertically relative to the first pivot axis, a size thereof in the width direction of the first plate is significantly reduced.

Preferably, the second surface of the first plate includes a surface extending vertically or substantially vertically relative to the second pivot axis. Since the second surface of the first plate includes a surface extending vertically or substantially vertically relative to the second pivot axis, a size thereof in the width direction of the first plate is significantly reduced.

Preferably, the third surface of the second plate includes a surface extending vertically or substantially vertically relative to the second pivot axis. Since the third surface of the second plate includes a surface extending vertically or substantially vertically relative to the second pivot axis, a size thereof in the width direction of the second plate is significantly reduced.

Preferably, the first bracket and the second bracket are integrally connected by a connecting bracket. Since the first bracket and the second bracket are integrally connected by the connecting bracket, the strength of the pedal unit is increased.

Preferably, the connecting bracket connects rear portions of the first bracket and the second bracket.

Preferably, the pedal unit includes a brake master cylinder integrally attached to the pedal unit through the connecting bracket. Since the brake master cylinder is integrally attached to the pedal unit through the connecting bracket, assembly efficiency is improved.

Preferably, the accelerator pedal includes an accelerator pedal arm rotatable about the first pivot axis, and an accelerator tread supported by the accelerator pedal arm; and the accelerator pedal arm is connected to a lower portion of the accelerator tread adjacent to the brake pedal.

Since the accelerator pedal arm is connected to the lower portion of the accelerator tread adjacent to the brake pedal, when an operating foot is moved from the brake pedal to the accelerator pedal, it guides the foot to the upper surface of the accelerator tread.

Preferably, the brake pedal includes a brake pedal arm rotatable about the second pivot axis, a brake tread supported by the brake pedal arm, and a plate extending from a side surface adjacent to the accelerator pedal to a lower middle portion of the brake tread.

Since the brake pedal includes the plate extending from the side surface adjacent to the accelerator pedal to the lower middle portion of the brake tread, when an operating foot is moved from the accelerator pedal to the brake pedal, it guides the foot to the upper surface of the brake tread.

Preferably, the pedal unit includes a brake reservoir tank connected to the brake master cylinder by an elastic pipe. Since the pedal unit includes a brake reservoir tank connected to the brake master cylinder by an elastic pipe, assembly efficiency is improved.

The pedal unit may include a clutch pedal rotatable about a third pivot axis, wherein the second plate includes a fourth surface on an opposite side of the third surface; and the second bracket supports the clutch pedal adjacent to the fourth surface of the second plate to be rotatable about the third pivot axis. Since the pedal unit also includes the clutch pedal, the pedal unit is easily attached to an ROV including a stepped transmission.

Preferably, the clutch pedal includes a clutch pedal arm rotatable about the third pivot axis; and the clutch pedal arm extends in a direction away from the brake pedal. Since the clutch pedal arm extends in a direction away from the brake pedal, a proximal portion of the brake pedal arm is disposed close to proximal portions of the other arms.

Preferably, the brake pedal arm extends in a direction approaching the accelerator pedal. Since the brake pedal arm extends in a direction approaching the accelerator pedal, the brake pedal is disposed away from the clutch pedal.

Preferably, the pedal unit includes a clutch master cylinder integrally attached to the fourth surface of the second bracket. Since the clutch master cylinder is integrally attached to the fourth surface of the second bracket, assembly efficiency is improved.

Preferably, the pedal unit includes a clutch reservoir tank connected to the clutch master cylinder by an elastic pipe. Since the pedal unit includes a clutch reservoir tank connected to the clutch master cylinder by an elastic pipe, assembly efficiency is improved.

A vehicle according to a second preferred embodiment of the present invention includes a pair of front wheels; at least a pair of rear wheels; a frame supported by the pair of front wheels and the pair of rear wheels; a seat section supported by the frame and including seats arranged side by side; a steering wheel disposed forward of the seat section; a roll cage supported by the frame to cover an area above the seat section and the steering wheel; and a pedal unit attached to the frame; wherein the pedal unit includes an accelerator pedal rotatable about a first pivot axis; a brake pedal rotatable about a second pivot axis; a first bracket including a first plate including a first surface and a second surface on a side opposite to the first surface and that supports the accelerator pedal adjacent to the first surface of the first plate and to be rotatable about the first pivot axis, and that supports the brake pedal adjacent to the second surface of the first plate and to be rotatable about the second pivot axis; a second bracket including a second plate including a third surface opposing the second surface and that supports the brake pedal adjacent to the third surface of the second plate and to be rotatable about the second pivot axis; and a connector that connects the first bracket, the brake pedal, and the second bracket in a state in which the brake pedal is disposed between the second surface of the first bracket and the third surface of the second bracket.

According to a preferred embodiment of the present invention, the accelerator pedal and brake pedal are attached to the plates extending in a fore-and-aft direction, and not to plates extending in a width direction. The respective pedals are therefore supported on the first surface and the second surface of the first plate, and the third surface of the second plate. Consequently, the pedal unit with a right-left support range for the two pedals is compact without necessitating an extra space in the width direction is attached to the vehicle.

The brake pedal which is heavily subjected to both oil pressure and weight load is supported by both the first bracket and the second bracket.

Preferably, the vehicle includes a first cover fixed to the frame and including an opening therein; and a second cover attachable to and detachable from the first cover to cover the opening; wherein the first bracket and the second bracket are integrally connected by a connecting bracket; the pedal unit includes a brake master cylinder integrally attached to the pedal unit through the connecting bracket, and a brake reservoir tank connected to the brake master cylinder by an elastic pipe; and the brake reservoir tank is accessible via the opening.

Since the brake reservoir tank is accessible via the opening of the first cover, access to the brake reservoir tank is through the opening simply by opening the second cover, so that maintainability is improved.

Preferably, the vehicle includes a radiator connected to a radiator reservoir tank by an elastic pipe; wherein the radiator reservoir tank is accessible via the opening of the first cover. Since the radiator reservoir tank is accessible via the opening of the first cover, access is made to the radiator reservoir tank via the opening only by opening the second cover, so that maintainability is improved.

Preferably, the pedal unit includes a connecting bracket that integrally connects the first bracket and the second bracket, and a brake master cylinder integrally attached to the pedal unit through the connecting bracket; and the brake master cylinder is disposed farther rearward of the vehicle than the second pivot axis.

Since the brake master cylinder is disposed farther rearward of the vehicle than the second pivot axis, a rear portion of the pedal unit is connected directly to the frame. Consequently, a pedal unit is conveniently disposed for an ROV including frame very close to the driver's seat.

Preferably, the pedal unit is fastened to the frame in a direction to receive a load acting in a direction of a yoke rod of the brake master cylinder. Since the pedal unit is fastened to the frame in the direction to receive the load of the yoke rod of the brake master cylinder, bending of the frame is prevented.

Preferred embodiments of the present invention provide a pedal unit attachable in a space-saving manner, and a vehicle including such a pedal unit.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 13A is a perspective view of a brake pedal according to a first preferred embodiment of the present invention.

FIG. 13B is a front view of the brake pedal.

FIG. 14 is a perspective view of a clutch pedal according to a preferred embodiment of the present invention.

DETAILED DESCRIPTION OF THE PREFERRED EMBODIMENTS

Preferred embodiments of the present invention will be described hereinafter with reference to the drawings. As a preferred embodiment of the vehicle in the present invention, an ROV is cited that is able to travel on uneven ground. In the following description, the terms front, rear, right and left are based on the direction of forward movement of the vehicle.

Figure 1:
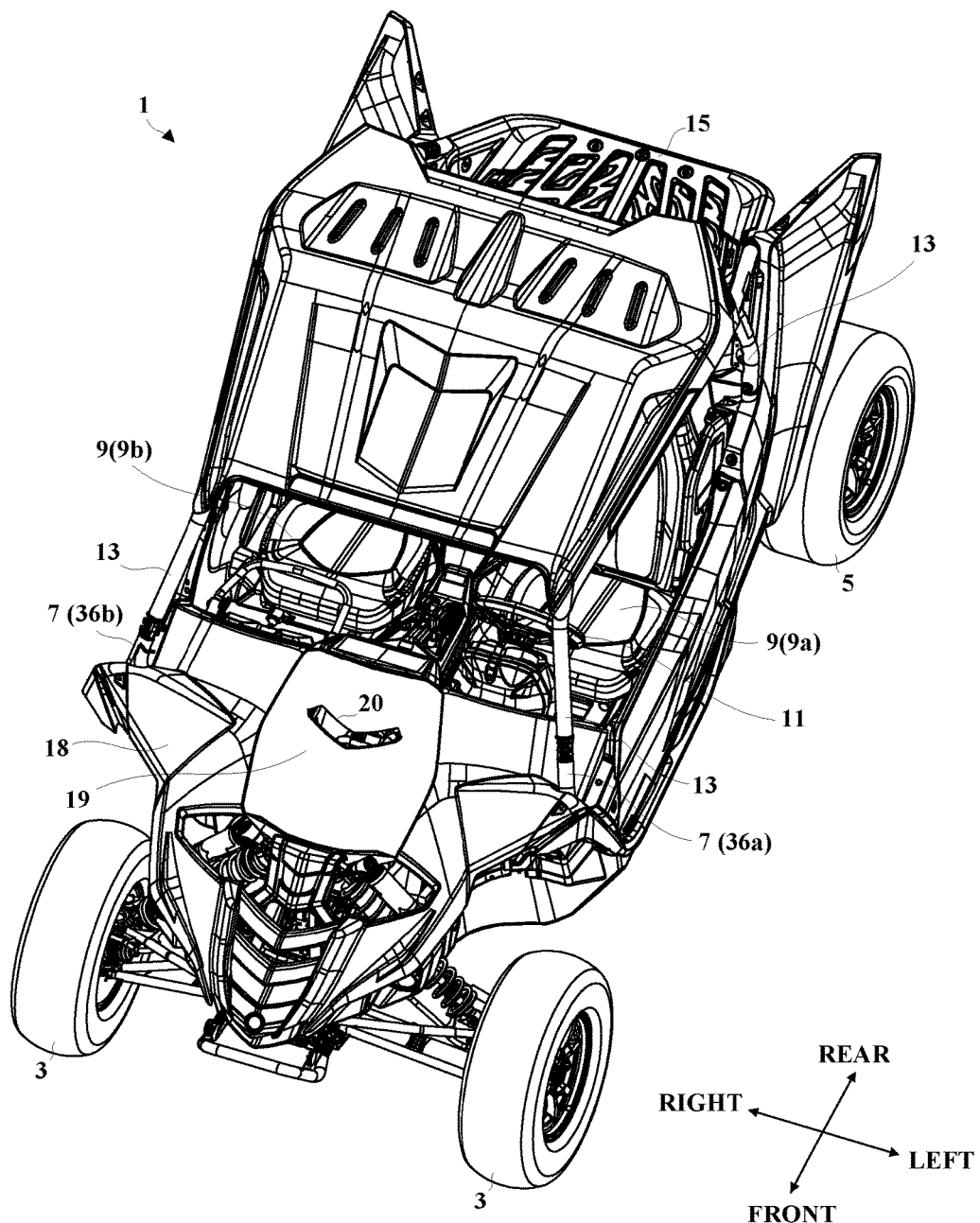
FIG. 1 is an overall perspective view of a vehicle according to a preferred embodiment of the present invention.

Reference is made to FIG. 1. FIG. 1 is an overall perspective view of a vehicle 1 according to a preferred embodiment of the present invention. The vehicle 1 is preferably an off-road vehicle that is able to travel on uneven ground. The vehicle 1 includes a pair of front wheels 3, a pair of rear wheels 5, a frame 7, a seat section 9, a steering wheel 11, a roll cage 13, and a cargo bed 15. The vehicle 1 also includes a pedal unit 17 attached to the frame 7 (see FIG. 3). The seat section 9 includes seats 9a and 9b arranged side by side.

The vehicle 1 includes a body cover 18 which covers the frame 7. The body cover 18 includes a removable cover 19 attached to a center of the body cover 18. The cover 19 includes an air intake bore 20 in a central portion thereof. The steering wheel 11 is disposed forward of the seat section 9. The roll cage 13 is supported by the frame 7 to cover an area above the seat section 9 and the steering wheel 11.

Figure 2:
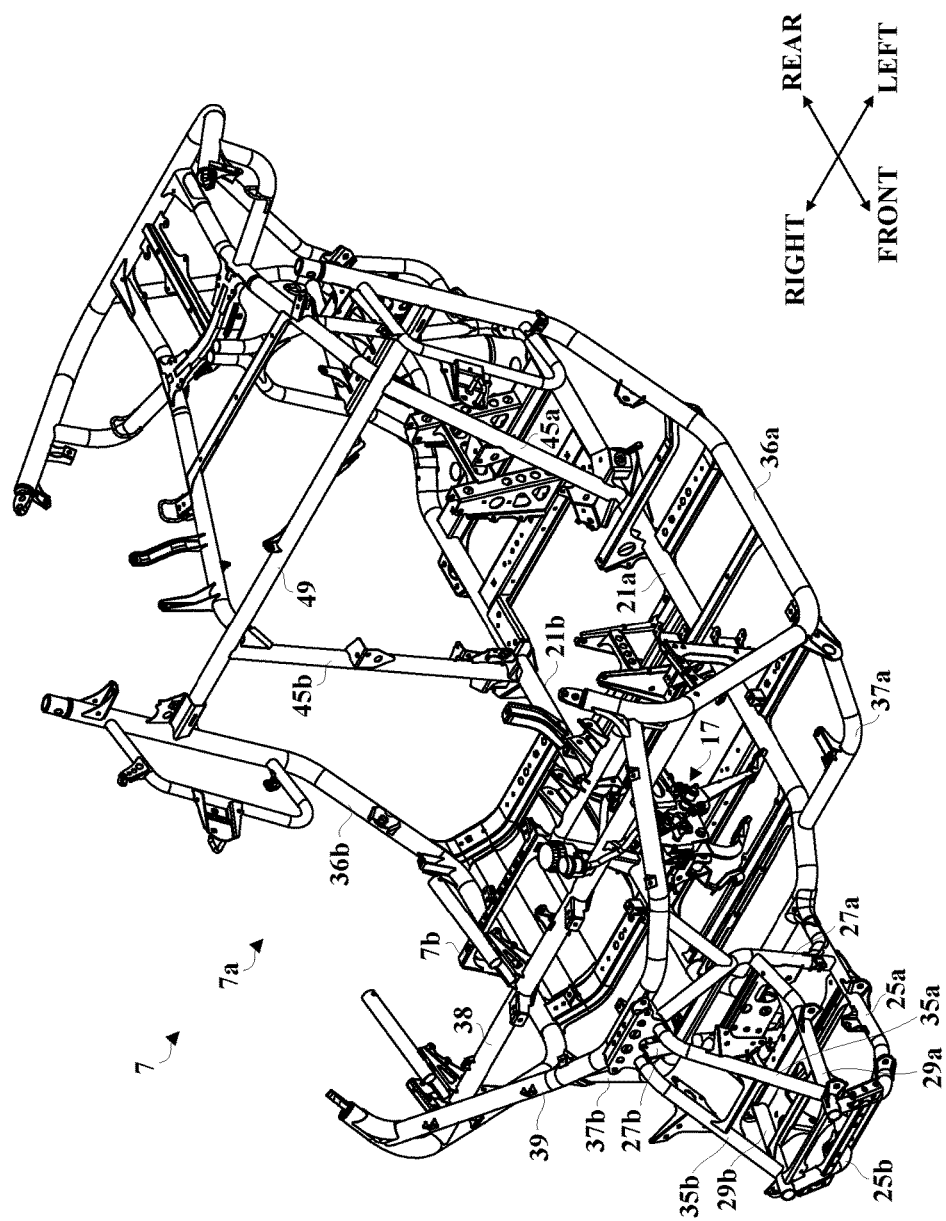
FIG. 2 is a perspective view of a frame of the vehicle according to a preferred embodiment of the present invention.
Figure 3:
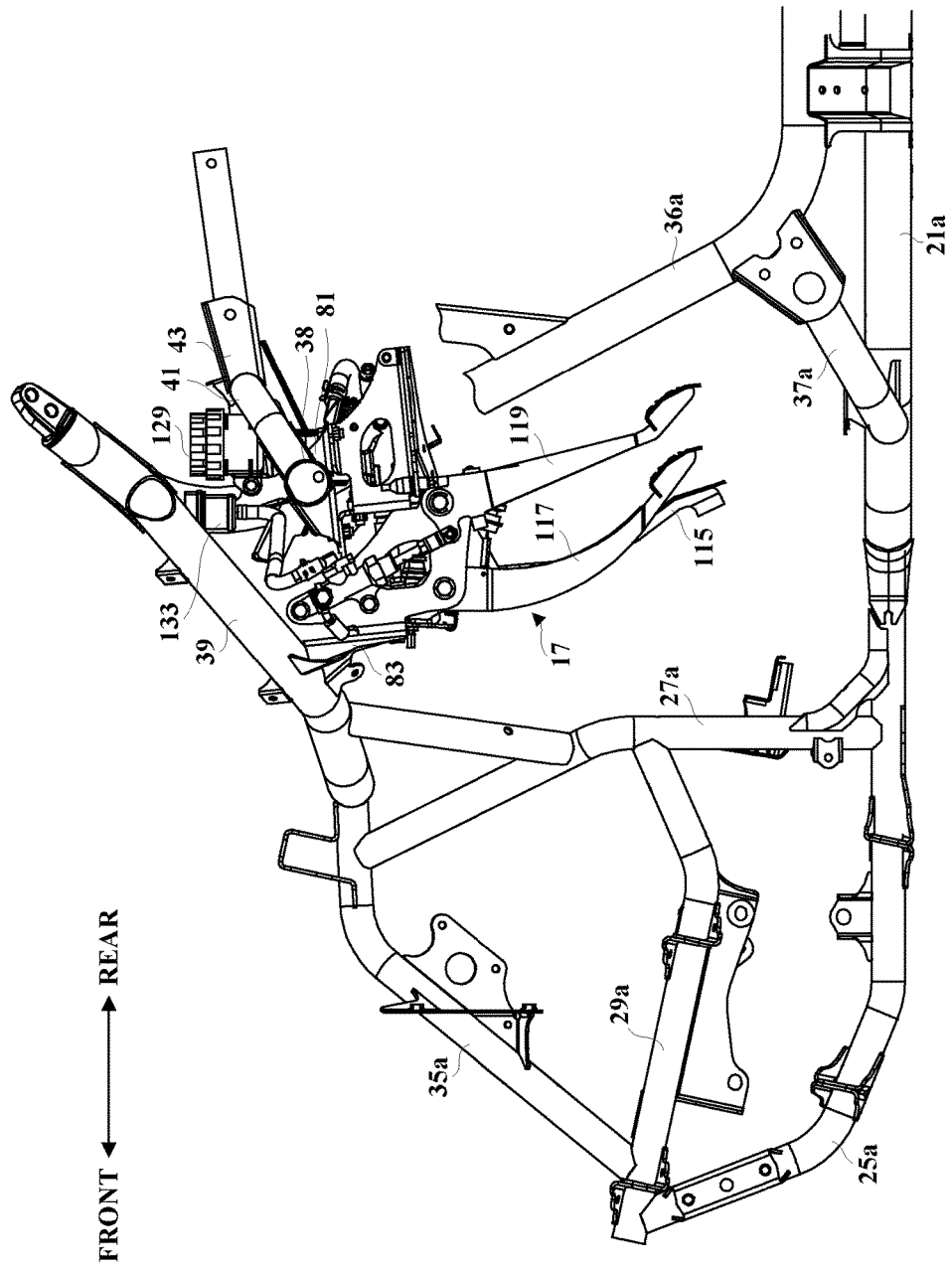
FIG. 3 is a side view of a front portion of the frame of the vehicle according a preferred embodiment of the present invention.

Next, reference is made to FIGS. 2 and 3. FIG. 2 is a perspective view of the frame of the vehicle 1. FIG. 3 is an enlarged side view of a front portion of the frame.

The frame 7 includes a main frame 7a supported by the pair of front wheels 3 and the pair of rear wheels 5, and a seat frame 7b supported by the main frame 7a. The seat section 9 is supported by the seat frame 7b.

The main frame 7a includes a pair of side frames 21a and 21b extending in a fore-and-aft direction. The side frame 21a and side frame 21b preferably extend parallel or substantially parallel to each other. A front portion of the side frame 21a and a front portion of the side frame 21b are joined together to define a U-shape.

A pair of side frames 25a and 25b extend further forward from front ends of the side frame 21a and side frame 21b. In a width direction of the vehicle 1, the side frames 25a and 25b are disposed inward of the side frames 21a and 21b. The side frame 25a and the side frame 25b preferably extend parallel or substantially parallel to each other. A pair of support frames 27a and 27b extend upward from rear positions of the side frames 25a and 25b.

A pair of side frames 29a and 29b extend forward from the support frames 27a and 27b above the side frames 25a and 25b. The side frame 29a and side frame 29b preferably extend parallel or substantially parallel to each other. Front portions of the side frames 25a and 25b are bent to extend upward, such that front ends of the side frames 25a and 25b and front ends of the side frames 29a and 29b are connected, respectively.

A pair of support frames 35a and 35b are connected to front portions of the side frames 29a and 29b. The support frames 35a and 35b extend obliquely rearward and upward from the front portions of the side frames 29a and 29b. Upper ends of the support frames 27a and 27b are connected to rear ends of the support frames 35a and 35b.

A pair of support frames 36a and 36b that are U-shaped in a side view are arranged outward of the side frames 21a and 21b in the width direction of the vehicle 1. The support frame 36a is connected to the side frame 21a through a frame 37a. The support frame 36b is connected to the side frame 21b through a frame 37b. A cross member 38 extending transversely is connected between a front portion of the support frame 36a and a front portion of the support frame 36b. The pedal unit 17 is connected to a leftward portion of the cross member 38.

A U-shaped frame 39 extends forward from the support frames 36a and 36b above the cross member 38. Opposite ends of the U-shaped frame 39 are connected to the support frames 36a and 36b. A middle portion of the U-shaped frame 39 is connected to the rear ends of the support frames 35a and 35b.

A pair of support frames 45a and 45b extend obliquely rearward and upward from the pair of side frames 21a and 21b. A cross member 49 extending transversely is connected to upper ends of the support frames 45a and 45b. Opposite ends of the cross member 49 are connected to rear portions of the support frames 36a and 36b, respectively. In FIG. 3, a portion of the support frame 36a is omitted to facilitate viewing of the pedal unit 17.

The roll cage 13 shown in FIG. 1 preferably has an inverted U-shape in a side view, and is supported by the frame 7. Front ends of the roll cage 13 are connected to upper front ends of the support frames 36a and 36b shown in FIG. 2, respectively. Rear ends of the roll cage 13 are connected to upper rear ends of the support frames 36a and 36b, respectively. The roll cage 13 is fixed to the support frames 36a and 36b using fastening elements such as bolts and nuts, for example.

The pedal unit 17 is supported by the leftward portion of the cross member 38 through a bracket 81, and is supported by a leftward portion of the U-shaped frame 39 through a bracket 83.

Figure 4:
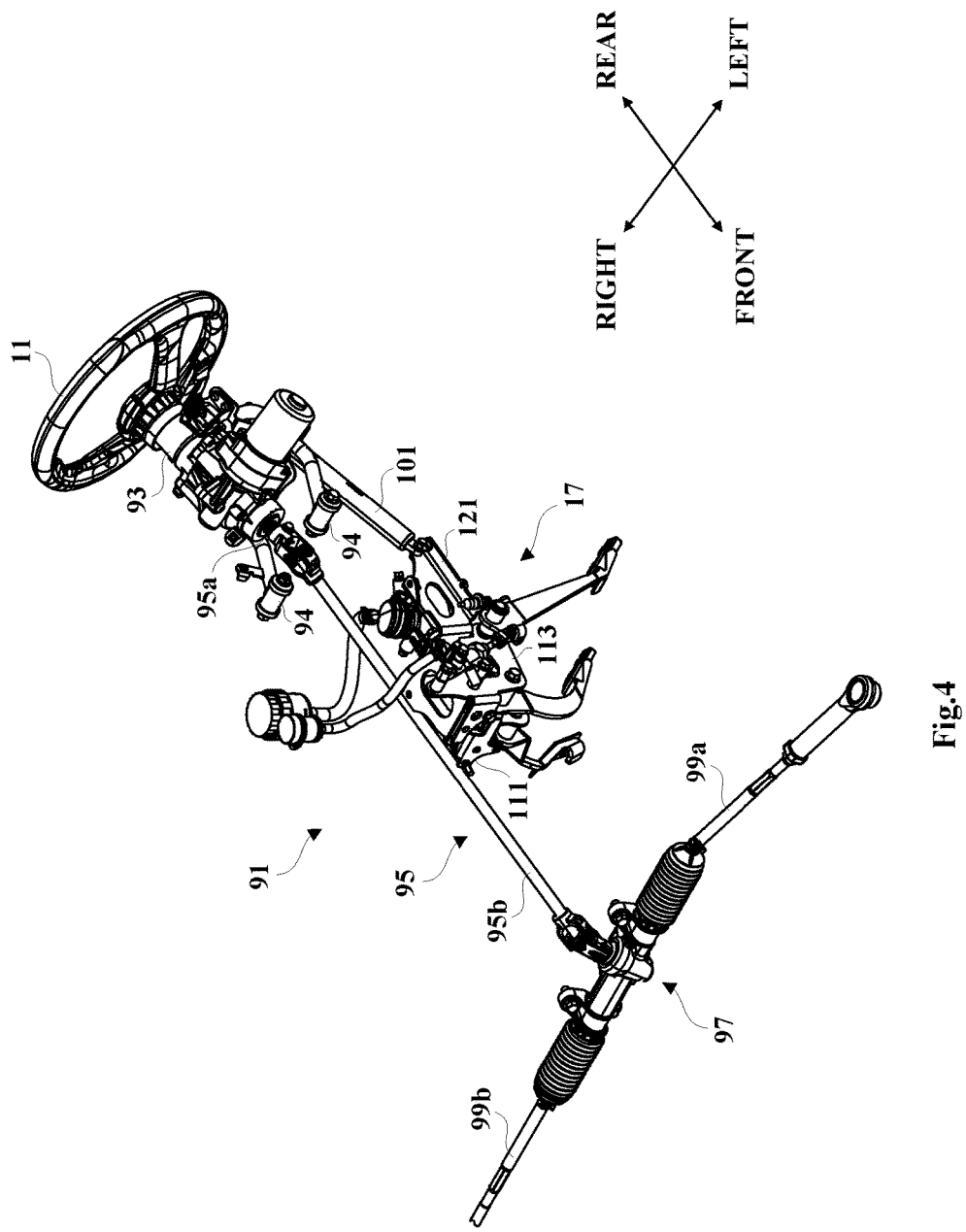
FIG. 4 is a front perspective view of a steering wheel according to a preferred embodiment of the present invention.

Next, a structure of the steering wheel of the vehicle 1 will be described with reference to FIG. 4. FIG. 4 is a front perspective view of the steering wheel.

The vehicle 1 includes a transfer mechanism 91 that transfers operations of the steering wheel 11 to the pair of front wheels 3. The transfer mechanism 91 includes a steering column 93, a steering shaft 95, a rack and pinion gear 97, and a pair of tie rods 99a and 99b.

The steering column 93 has a hollow shape, and rotatably supports the steering wheel 11. An attaching portion 94 connected to the steering column 93 is attached to a bracket 43 of a subframe 41 connected to the cross member 38 (see FIG. 3). Thus, the steering column 93 is supported by the cross member 38 of the frame 7 through the bracket 43.

Reference is made to FIG. 4. The steering shaft 95 includes a first shaft 95a and a second shaft 95b. The first shaft 95a is rotatably inserted in the steering column 93. The first shaft 95a has an upper end thereof connected to the steering wheel 11. A lower end of the first shaft 95a is connected to an upper end of the second shaft 95b. A lower end of the second shaft 95b is connected to the rack and pinion gear 97. Any one of various known rack and pinion gears can be used as the rack and pinion gear 97. The tie rods 99a and 99b connect the rack and pinion gear 97 and the front wheels 3. The pedal unit 17 is disposed to the left of the steering shaft 95.

Operation of the steering wheel 11 is transferred to the front wheels 3 through the steering shaft 95, the rack and pinion gear 97, and the pair of tie rods 99a and 99b. As a result, the pair of front wheels 3 are steered.

A gas damper 101 is disposed below the steering column 93 to adjust a height of the steering wheel 11. A front end of the gas damper 101 is connected to a rear end of a connecting bracket 121 of the pedal unit 17. The pedal unit 17 includes a first bracket 111 and a second bracket 113 arranged to the left of the second shaft 95b.

Figure 5:
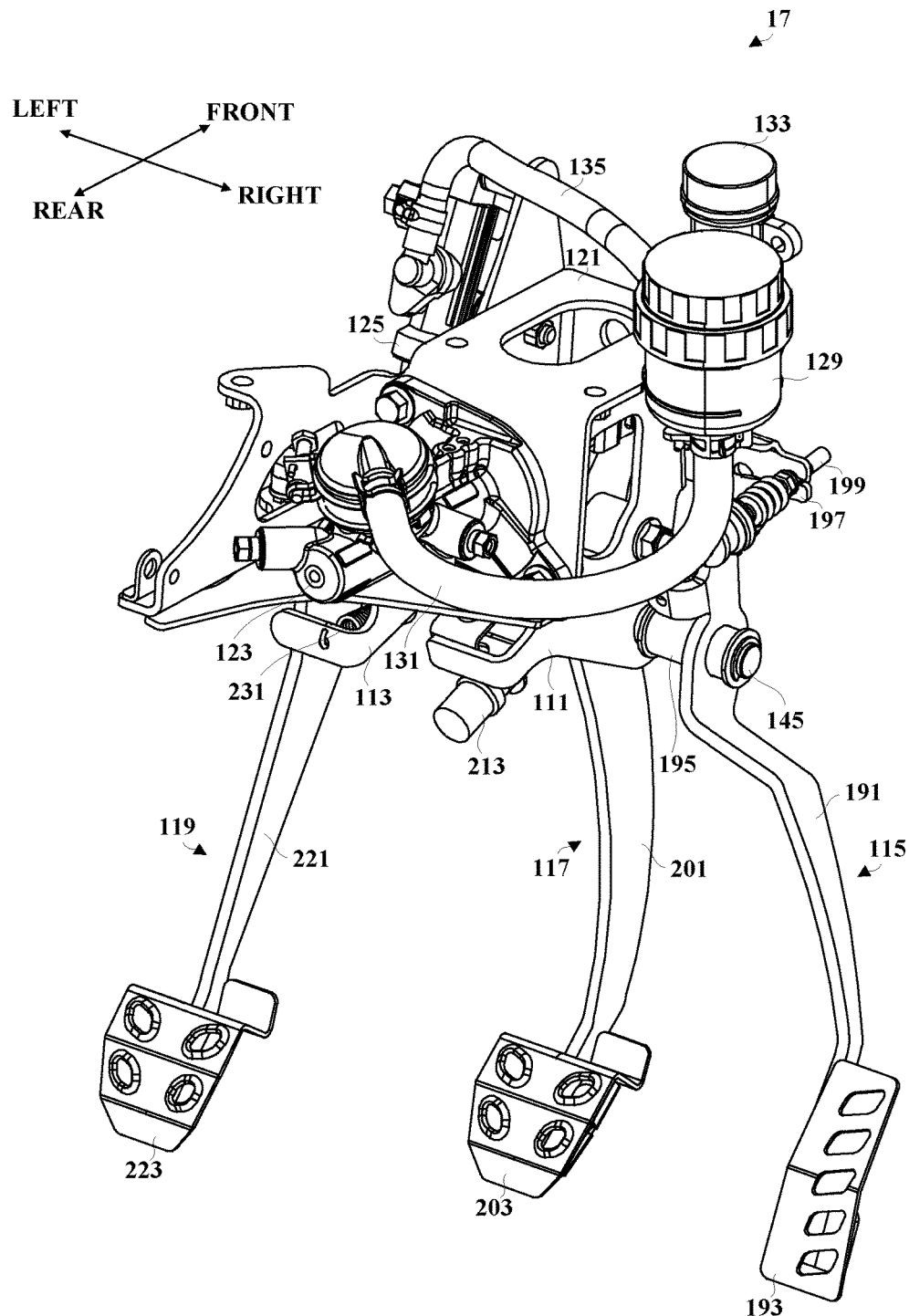
FIG. 5 is a right rear perspective view of a pedal unit according to a first preferred embodiment of the present invention.
Figure 6:
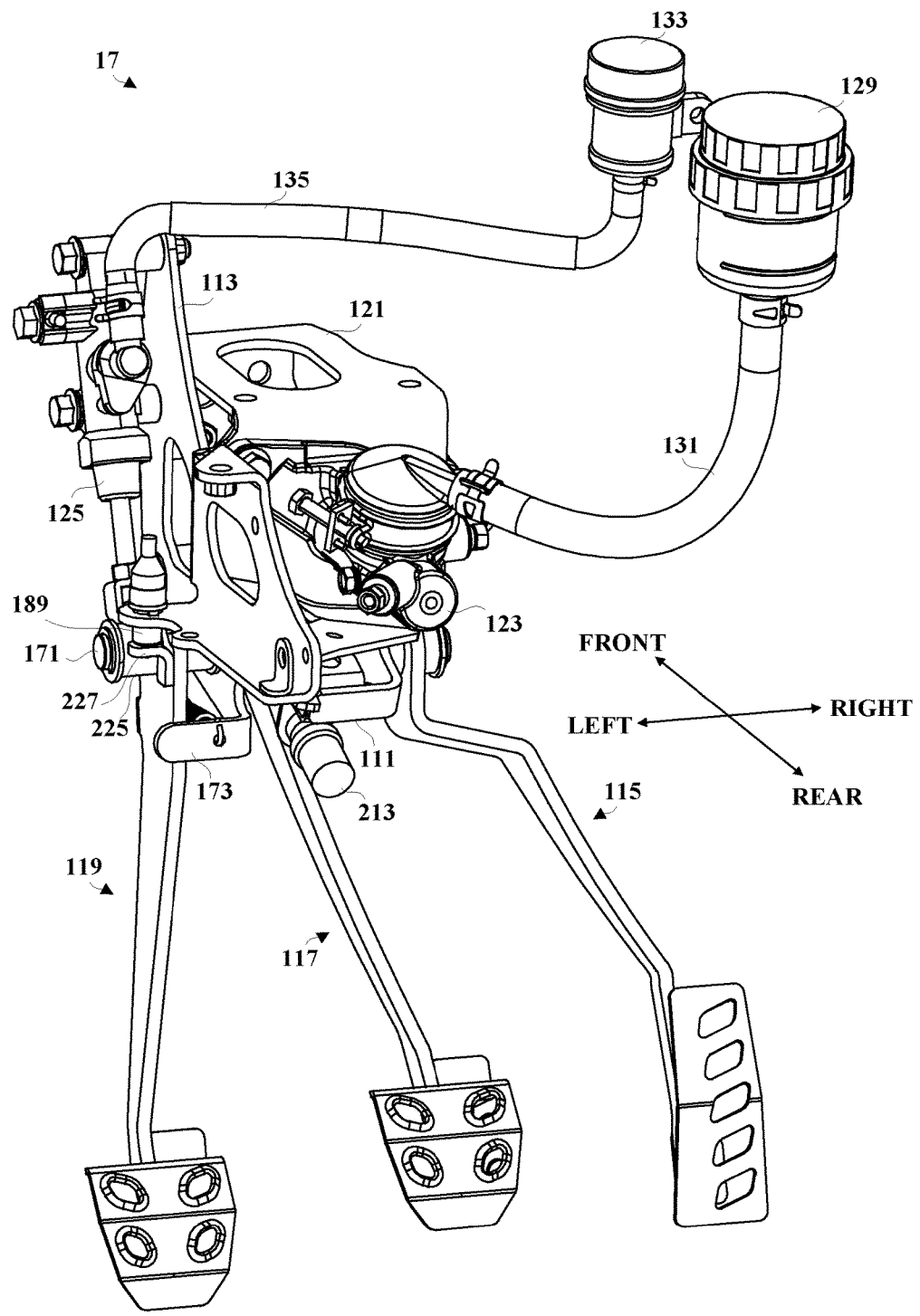
FIG. 6 is a left rear perspective view of the pedal unit according to the first preferred embodiment of the present invention.
Figure 7:
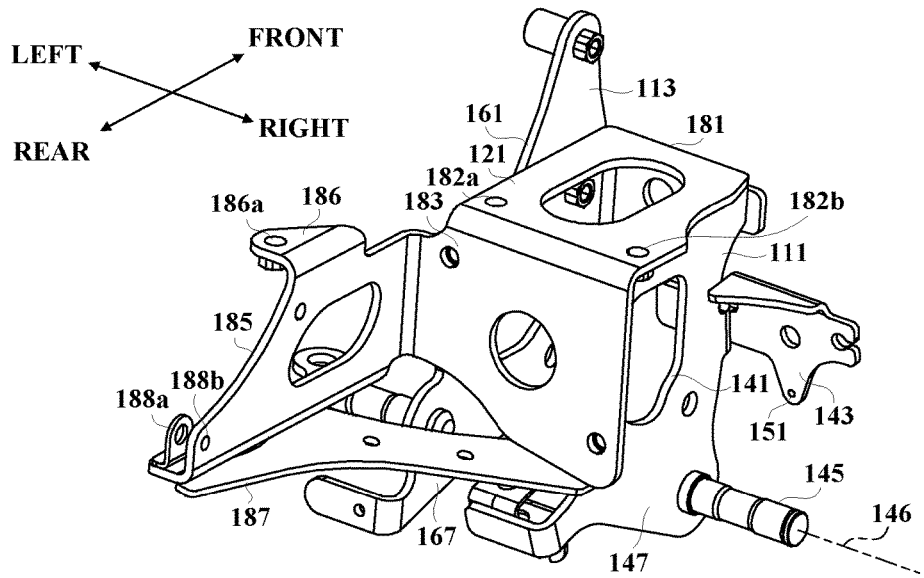
FIG. 7 is a right rear perspective view of a bracket of the pedal unit according to the first preferred embodiment of the present invention.
Figure 8:
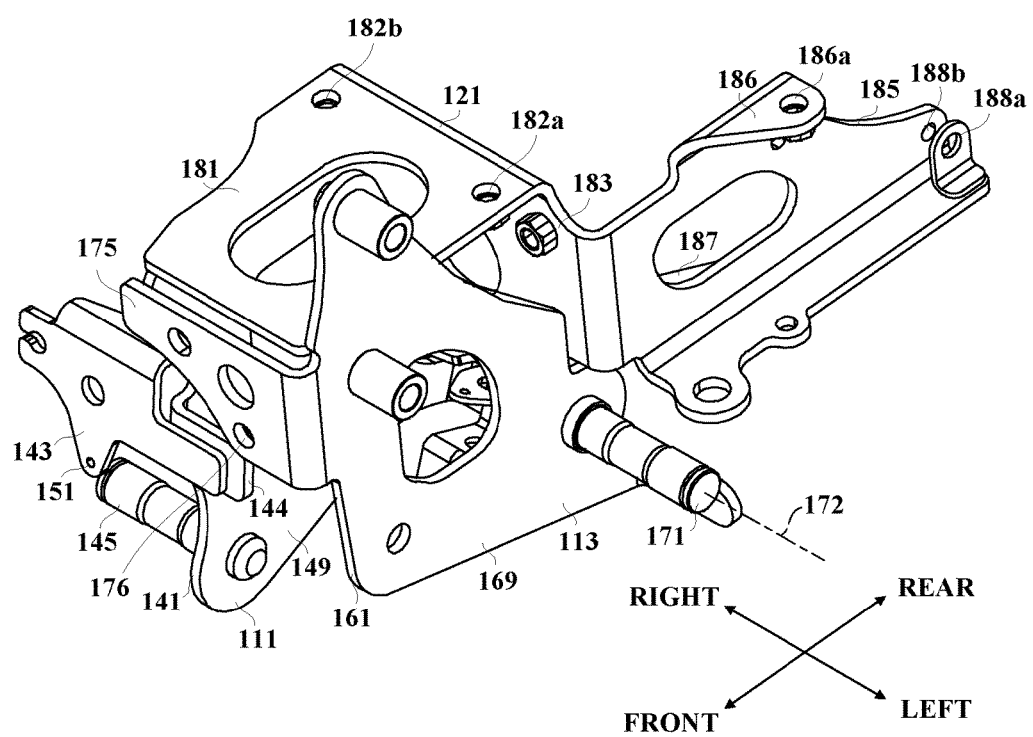
FIG. 8 is a left front perspective view of the bracket of the pedal unit according to the first preferred embodiment of the present invention.
Figure 9:
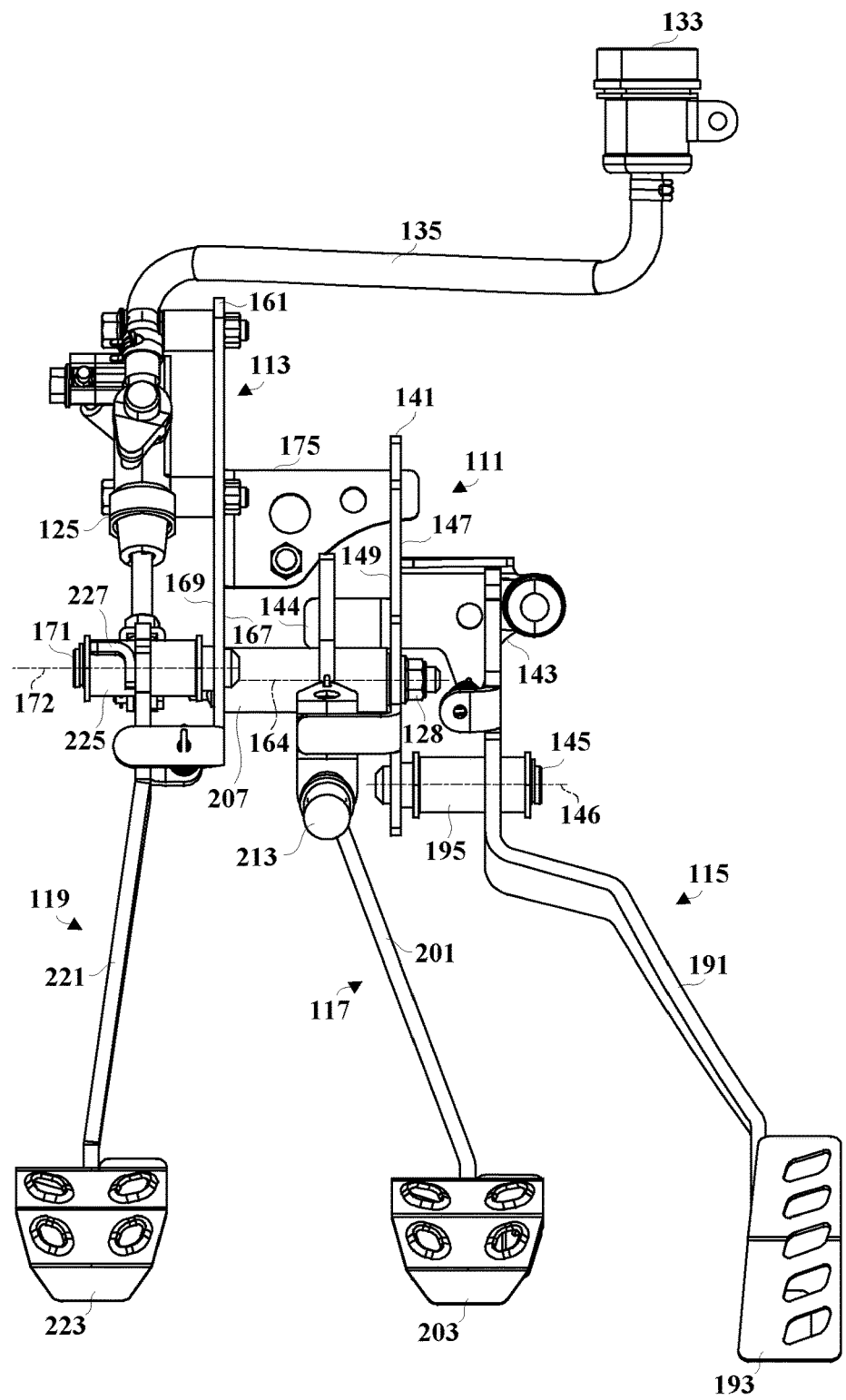
FIG. 9 is a rear view of a state in which a connecting bracket of the pedal unit is removed according to the first preferred embodiment of the present invention.
Figure 10:
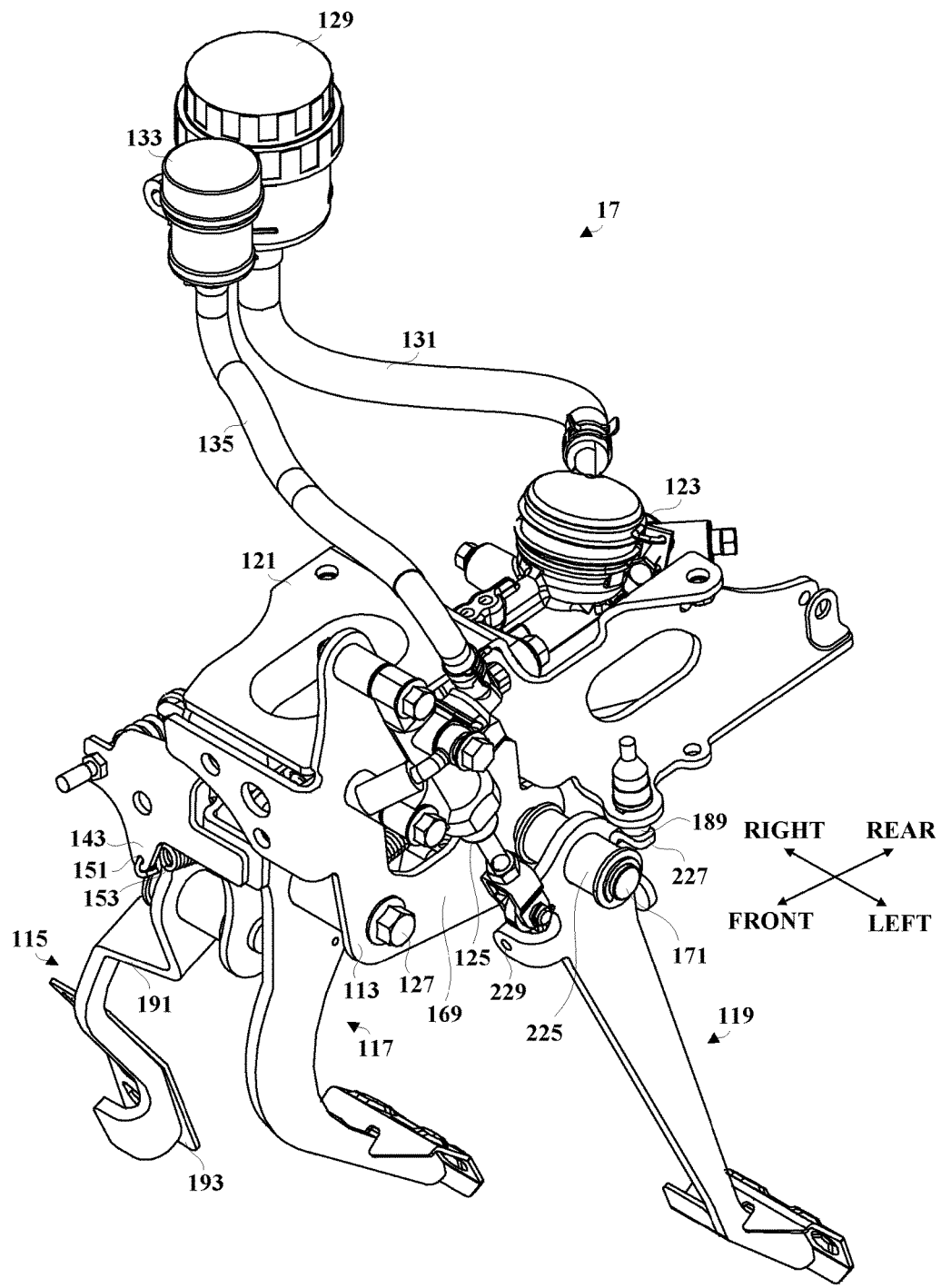
FIG. 10 is a left front perspective view of the pedal unit according to the first preferred embodiment of the present invention.

Next, a structure of the pedal unit of the vehicle 1 will be described with reference to FIGS. 5 through 10. FIG. 5 is a right rear perspective view of the pedal unit. FIG. 6 is a left rear perspective view of the pedal unit. FIG. 7 is a right rear perspective view of a bracket of the pedal unit. FIG. 8 is a left front perspective view of the bracket of the pedal unit. FIG. 9 is a rear view of a state in which a connecting bracket of the pedal unit is removed. FIG. 10 is a left front perspective view of the pedal unit.

The pedal unit 17 includes the first bracket 111, the second bracket 113, an accelerator pedal 115, a brake pedal 117, a clutch pedal 119, the connecting bracket 121, a brake master cylinder 123, and a clutch master cylinder 125.

The pedal unit 17 further includes a brake reservoir tank 129, an elastic pipe 131, a clutch reservoir tank 133, and an elastic pipe 135. The brake reservoir tank 129 is connected to the brake master cylinder 123 by the elastic pipe 131. The clutch reservoir tank 133 is connected to the clutch master cylinder 125 by the elastic pipe 135.

Reference is made to FIGS. 7, 8, and 9. The first bracket 111 includes a plate 141 preferably having a flat plate extending in the fore-and-aft direction, an accelerator pedal stopper 143 that stops the accelerator pedal 115 in an initial position, and a brake pedal stopper 144 that stops the brake pedal 117 in an initial position. The brake pedal stopper 144 extends leftward from a front end of the plate 141. The accelerator pedal stopper 143 is connected to a front portion of the brake pedal stopper 144, and extends rightward from the brake pedal stopper 144. The plate 141 corresponds to the first plate in a preferred embodiment of the present invention.

The plate 141 includes a first surface 147 to which a left end of a shaft 145 is fixed, and a second surface 149 on an opposite side in the right-left direction of the first surface 147. The shaft 145 has a shaft center line corresponding to an accelerator pivot axis 146 defining a pivot axis of the accelerator pedal 115. The first surface 147 preferably extends vertically relative to the accelerator pivot axis 146. The first surface 147 need not be entirely vertical relative to the accelerator pivot axis 146. As long as the first surface 147 includes a vertically-extending surface in and around an area thereof connected to the accelerator pivot axis 146, the other areas need not be vertical. Since the first surface 147 of the plate 141 includes a surface extending vertically relative to the accelerator pivot axis 146, a size thereof in the width direction of the plate 141 is significantly reduced. The accelerator pivot axis 146 corresponds to the first pivot axis in a preferred embodiment of the present invention.

The second surface 149 preferably extends vertically relative to a brake pivot axis 164 that is a pivot axis of the brake pedal 117. The second surface 149 need not be entirely vertical to the brake pivot axis 164. As long as the second surface 149 includes a vertically-extending surface in and around an area thereof connected to the brake pivot axis 164, the other areas need not be vertical. Since the second surface 149 of the plate 141 includes the surface extending vertically relative to the brake pivot axis 164, a size thereof in the width direction of the plate 141 is significantly reduced. The brake pivot axis 164 corresponds to the second pivot axis in a preferred embodiment of the present invention.

Thus, the first bracket 111 includes the plate 141 including the first surface 147 and the second surface 149 on the opposite side of the first surface 147. The first bracket 111 supports the accelerator pedal 115 adjacent to the first surface 147 of the plate 141 so as to be pivotable about the accelerator pivot axis 146, and supports the brake pedal 117 adjacent to the second surface 149 of the plate 141 so as to be pivotable about the brake pivot axis 164.

The second bracket 113 includes a plate 161 preferably having a flat plate extending in the fore-and-aft direction. The plate 161 includes a third surface 167 preferably extending vertically relative to the brake pivot axis 164, and a fourth surface 169 on the opposite side of the third surface 167. The third surface 167 need not be entirely vertical to the brake pivot axis 164. As long as the third surface 167 includes a vertically-extending surface in and around an area thereof connected to the brake pivot axis 164, the other areas need not be vertical. Since the third surface 167 of the plate 161 includes the surface extending vertically relative to the brake pivot axis 164, a size thereof in the width direction of the plate 161 is significantly reduced. The plate 161 corresponds to the second plate in a preferred embodiment of the present invention.

The second bracket 113 supports the clutch pedal 119 adjacent to the fourth surface 169 of the plate 161 so as to be pivotable about a clutch pivot axis 172. By unitizing the clutch pedal 119 in this manner, the pedal unit 17 is easily attached to an ROV including a stepped transmission.

Figure 11:
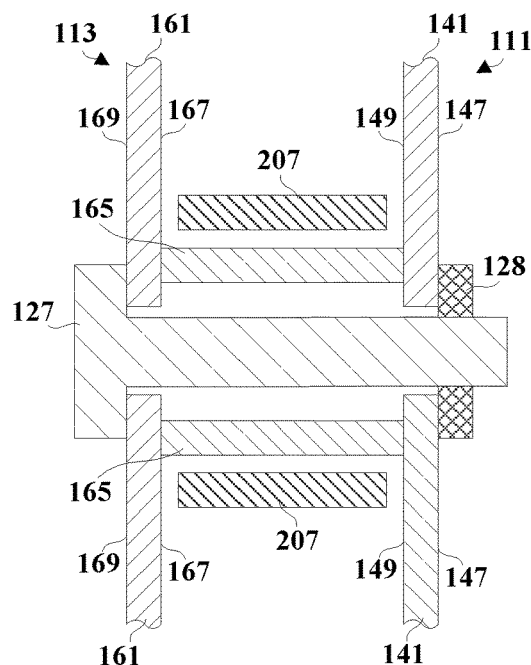
FIG. 11 is a view in vertical section of a connection between a first bracket and a second bracket according to a preferred embodiment of the present invention.

Next, reference is made to FIG. 11. FIG. 11 is a vertical sectional view of portions of the first bracket 111 and the second bracket 113 connected with a bolt 127. The pedal unit 17 includes the bolt 127 and a nut 128. A hollow collar 207 of the brake pedal 117 is fitted outside a pipe 165. In this state, the pipe 165 is pinched between the second surface 149 of the first bracket 111 and the third surface 167 of the second bracket 113. The bolt 127 penetrates the inside of the pipe 165 and is fixed with the nut 128. Thus, the bolt 127 and nut 128 connect the first bracket 111, brake pedal 117, and the second bracket 113 in a state in which the brake pedal 117 is disposed between the second surface 149 of the first bracket 111 and the third surface 167 of the second bracket 113. The bolt 127 and nut 128 correspond to the connectors in a preferred embodiment of the present invention. Instead of using the bolt 127 and nut 128, the collar 207 may be fixed with screws or the like to perform the function of a connector.

A brake pedal arm 201 connected to the collar 207 is supported by both the first bracket 111 and the second bracket 113. This increases the durability of the brake pedal 117 which undergoes a larger load application than the other pedals.

Next, reference is made to FIGS. 8 through 10. A right end of a shaft 171 is fixed to the fourth surface 169. The shaft 171 is disposed to have a shaft center line corresponding to a clutch pivot axis 172 defining a pivot axis of the clutch pedal 119. The fourth surface 169 preferably extends vertically relative to the clutch pivot axis 172. The fourth surface 169 need not be entirely vertical relative to the clutch pivot axis 172. As long as the fourth surface 169 includes a vertically-extending surface in and around an area thereof connected to the clutch pivot axis 172, the other areas need not be vertical. The clutch pivot axis 172 corresponds to the third pivot axis in a preferred embodiment of the present invention.

The clutch master cylinder 125 is integrally attached to the fourth surface 169. The clutch master cylinder 125 generates a hydraulic pressure corresponding to a tread force applied to the clutch pedal 119. Oil is supplied from the clutch reservoir tank 133 to the clutch master cylinder 125 through the elastic pipe 135. Since the clutch master cylinder 125 is integrally attached to the fourth surface 169 of the second bracket 113, assembling efficiency is improved.

Next, reference is made to FIGS. 7 and 8. The first bracket 111 and the second bracket 113 are integrally connected by the connecting bracket 121. The connecting bracket 121 connects rear portions of the first bracket 111 and the second bracket 113. The connecting bracket 121 includes a first plate 181, a second plate 183, a third plate 185, and a reinforcing plate 187.

The first plate 181 connects an upper end of the first bracket 111 and the third surface 167 of the second bracket 113. The second plate 183 connects a rear portion of the first bracket 111 and a rear portion of the second bracket 113. The first plate 181 and the second plate 183 are connected to each other to define an L-shape in a side view. Rear end surfaces of the first bracket 111 and the second bracket 113 face the driver and are connected by the second plate 183, which preferably has a flat plate shape. Since the first bracket 111 and the second bracket 113 are integrally connected by the connecting bracket 121, the strength of the pedal unit 17 is increased.

The third plate 185 extends rearward from a left end of the second plate 183. The second plate 183 and the third plate 185 define an L-shape in a plan view. The reinforcing plate 187 is connected to a lower end of the second plate 183 and a lower end of the third plate 185. The brake master cylinder 123 is mounted on an upper surface of the reinforcing plate 187, and is attached to a rear surface of the second plate 183.

Since the brake master cylinder 123 is integrally attached to the pedal unit 17 through the connecting bracket 121, assembly efficiency is improved. A clutch switch 189 is attached to a left surface of the third plate 185 (see FIG. 10).

The brake master cylinder 123 is disposed farther rearward in the vehicle than the brake pivot axis 164. This allows the rear of the pedal unit 17 to be connected to the cross member 38. The pedal unit 17 and the cross member 38 are conveniently disposed very close to the seat section 9.

The first plate 181 includes bores 182a and 182b in rear positions thereof. The third plate 185 includes a section 186 projecting to the left from an upper position thereof, and the section 186 includes a bore 186a therein. The bores 182a, 182b and 186a are connected to the bracket 81. Therefore, the upper surface of the first plate 181 and the section 186 of the third plate 185 are connected to the cross member 38 through the bracket 81.

The second bracket 113 includes a section 175 extending rightward from the front end thereof. The section 175 includes bores 176 therein. The bores 176 are connected to the bracket 83. Therefore, the front end of the second bracket 113 is connected to the U-shaped frame 39 through the bracket 83. Since the pedal unit 17 is connected to the two frame members, i.e., the cross member 38 and the U-shaped frame 39, a load applied to the pedal unit 17 is dispersed to the frame 7. Additionally, the pedal unit 17 is attached with increased stability.

The third plate 185 includes bores 188a and 188b in rear end positions thereof. The bores 188a and 188b are connected to a front end of the gas damper 101 of the steering wheel 11.

Next, reference is made to FIGS. 9 and 10. Interference between the shaft 145 and bolt 127 is prevented by vertically spacing apart the accelerator pivot axis 146 and brake pivot axis 164. This significantly reduces the size thereof in the width direction of the pedal unit 17. Interference between the shaft 171 and bolt 127 is prevented by spacing apart the brake pivot axis 164 and clutch pivot axis 172 in the fore-and-aft direction. This further prevents or significantly reduces a size thereof in the width direction of the pedal unit 17.

Figure 12A:
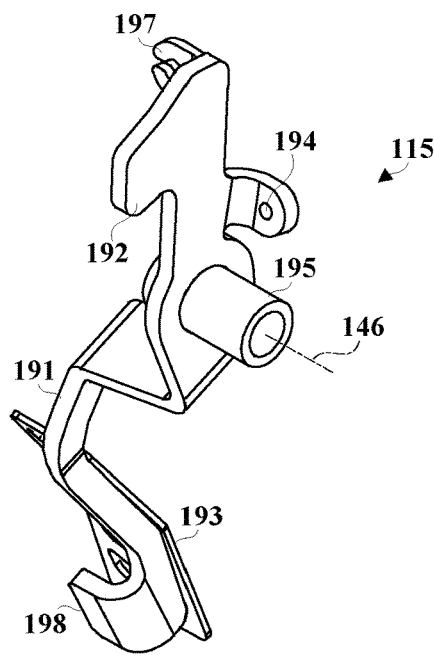
FIG. 12A is a perspective view of an accelerator pedal according to a preferred embodiment of the present invention.
Figure 12B:
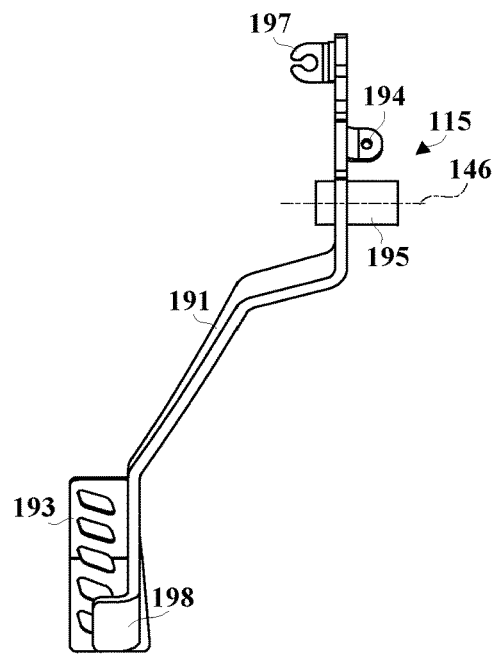
FIG. 12B is a front view of the accelerator pedal.

Next, reference is made to FIGS. 5, 9, 12A and 12B. FIG. 12A is a front perspective view of the accelerator pedal, and FIG. 12B is a front view of the accelerator pedal. The accelerator pedal 115 includes an accelerator pedal arm 191 pivotable about the accelerator pivot axis 146, an accelerator tread 193 supported by the accelerator pedal arm 191, a collar 195, and a wire support 197. The collar 195 of the accelerator pedal 115 receives the shaft 145 of the first bracket 111 extending therethrough, and the right end of the collar 195 is rotatably fixed by a washer and an E-type retaining ring, for example. Thus, the accelerator pedal arm 191 is supported by the first bracket 111 in a cantilever manner.

The accelerator pedal arm 191 extends rightward as it extends downward. That is, the accelerator pedal arm 191 extends in a direction away from the brake pedal 117. Since the accelerator pedal arm 191 extends in the direction away from the brake pedal 117, a proximal portion of the accelerator pedal arm 191 and a proximal portion of the brake pedal arm 201 are arranged close to each other.

The accelerator pedal arm 191 is connected to a lower portion of the accelerator tread 193 adjacent to the brake pedal 117. The portion connecting the accelerator tread 193 and the accelerator pedal arm 191 defines and functions as a guide. When the driver moves his or her foot from a brake tread 203 to the accelerator tread 193, although the brake tread 203 is located below the accelerator tread 203, the connecting portion defines and functions as a guide to guide the foot of the driver to an upper portion of the accelerator tread 193.

The accelerator pedal arm 191 includes a bent portion 193 which is bent away from the brake pedal 117 after being connected to the lower portion of the accelerator tread 193. When the driver steps on the accelerator tread 193 and presses it down to a large extent, the bent portion 193 at the lower end of the accelerator pedal arm 191 will contact the floor, thus stopping the pressing on the accelerator pedal 115. Since a maximum rotation angle of the accelerator pedal arm 191 is determined by the thickness of the bent portion, an upper limit of the amount of pressure on the accelerator pedal is specified.

An accelerator wire 199 passes through the wire support 197 provided in an upper position of the accelerator pedal 115. The accelerator wire 199 is extendible according to a rotation angle of the accelerator pedal 115. In response to an amount of extension of the accelerator wire 199, a fuel discharge rate of a fuel injection device is adjusted.

Reference is made to FIG. 10. The pedal stopper 143 includes a bore 151 therein, and the bore 151 and a bore 194 of the accelerator pedal 115 are connected by a spring 153. When the driver steps on the accelerator tread 193 of the accelerator pedal arm 115, the accelerator pedal arm 191 will rotate to move the accelerator tread 193 forward. When thereafter the driver stops pressing down the accelerator tread 193, the accelerator pedal arm 191 will rotate and allow the spring 153 to move the accelerator tread 193 backward. The rotation of the accelerator pedal arm 191 is completed when a projecting portion 192 of the accelerator pedal arm 191 contacts the pedal stopper 143, and the accelerator pedal arm 191 returns to the initial position.

Next, reference is made to FIGS. 5, 9, 13A and 13B. FIG. 13A is a perspective view of the brake pedal, and FIG. 13B is a front view of the brake pedal. The brake pedal 117 includes a brake pedal arm 201 rotatable about the brake pivot axis 164, a brake tread 203 supported by the brake pedal arm 201, a plate 205 extending from a side surface adjacent to the accelerator pedal 115 to a lower middle portion of the brake tread 203, a collar 207 fitted on the pipe 165, a first projecting portion 209, and a second projecting portion 211.

The brake pedal arm 201 extends in a direction approaching the accelerator pedal 115 as it extends downward. Since the brake pedal arm 201 extends in the direction approaching the accelerator pedal 115, the brake pedal tread 203 is disposed away from a clutch pedal tread 223.

The brake pedal arm 201 connects to the lower middle portion of the brake tread 203. This connection portion of the brake pedal arm 201 and the end adjacent to the accelerator pedal 115 of the brake tread 203 are connected through the plate 205 which extends obliquely. The plate 205 defines and functions as a guide. When the driver moves his or her foot from the accelerator pedal tread 193 to the brake tread 203, although the accelerator tread 193 is located below the brake tread 203, the plate 205 defines and functions as a guide to guide the foot of the driver to the upper surface of the brake tread 203.

The first projecting portion 209 is located above and forward of the collar 207. The first projecting portion 209 moving into contact with the brake pedal stopper 144 of the second bracket 113 stops backward rotation of the brake pedal 117 about the brake pivot axis 164.

The second projecting portion 211 will push a brake switch 213 attached to the first bracket 111 when the brake pedal arm 201 rotates forward. This switch signal will light up the taillights of the vehicle 1 to notify a following vehicle that the vehicle 1 is slowing down.

Next, reference is made to FIGS. 5, 9 and 14. FIG. 14 is a perspective view of the clutch pedal. The clutch pedal 119 includes a clutch pedal arm 221 rotatable about the clutch pivot axis 172, a clutch tread 223 supported by the clutch pedal arm 221, a collar 225 fitted on the shaft 171, a projecting portion 227, and a bore 229. The collar 225 of the clutch pedal 119 receives the shaft 171 of the second bracket 113 extending therethrough, and a left end of the collar 225 is rotatably fixed by a washer and an E-type retaining ring, for example. Thus, the clutch pedal arm 221 is supported by the second bracket 113 in a cantilever manner.

The clutch pedal arm 221 extends in a direction away from the brake pedal 117 as it extends downward. Since the clutch pedal arm 221 is spaced apart from the brake pedal 117, the clutch tread 223 and brake tread 203 are arranged further away from each other, which provides improved operability. A proximal portion of the clutch pedal arm 221 is placed close to the proximal portion of the brake pedal arm 117.

When the clutch pedal arm 221 rotates forward, pressing by the projecting portion 227 on the clutch switch 189 on the connecting bracket 121 will be canceled. With this switch signal, the engine of the vehicle 1 is started. A spring 231 is provided between the bore 229 and a rear portion of the second bracket 113. When the foot separates from the clutch tread 223, its elastic force will return the clutch pedal 119 to the initial position.

Figure 15:
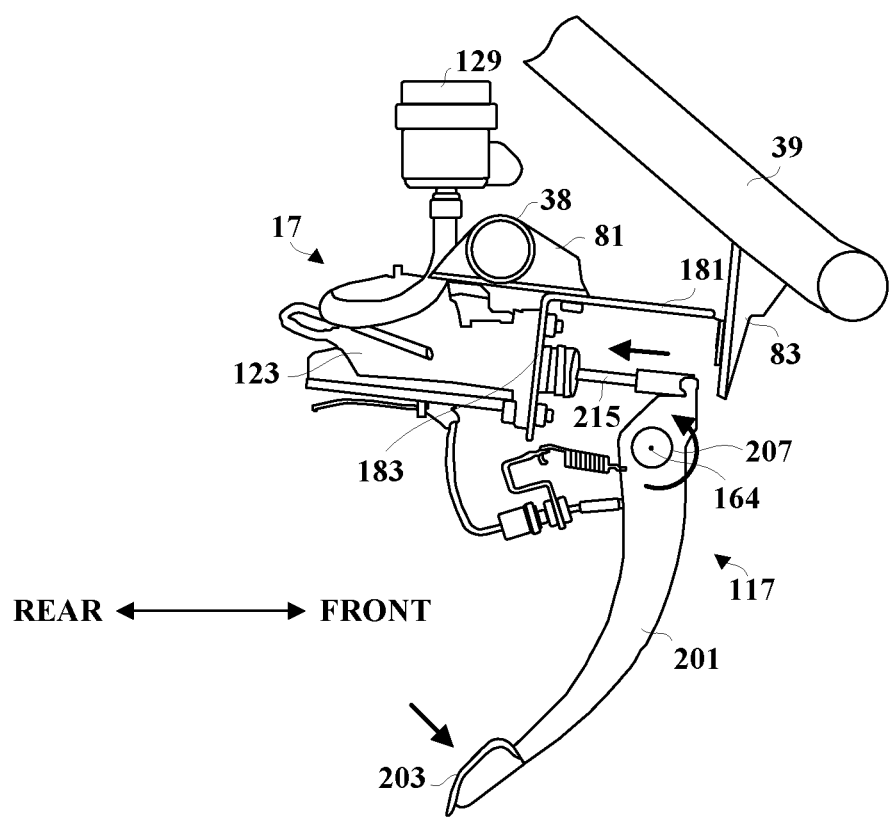
FIG. 15 is an explanatory view illustrating a motion of a yoke rod of a brake master cylinder according to a first preferred embodiment of the present invention.

The effects of the brake master cylinder 123 being disposed rearward of the brake pivot axis 164 will be described with reference to FIG. 15. FIG. 15 is an explanatory view illustrating a motion of a yoke rod 215 of the brake master cylinder 123. The pedal unit 17 is fastened to the cross member 38 of the frame 7 in a direction to receive a load in a direction of the yoke rod 215 of the brake master cylinder 123. When the brake tread 203 is pressed down, the brake arm 201 will rotate forward about the brake pivot axis 164 to push the yoke rod 215 rearward. Since the cross member 38 is located in this rearward pushing direction, the cross member 38 is hardly subjected to bending.

Figure 16A:
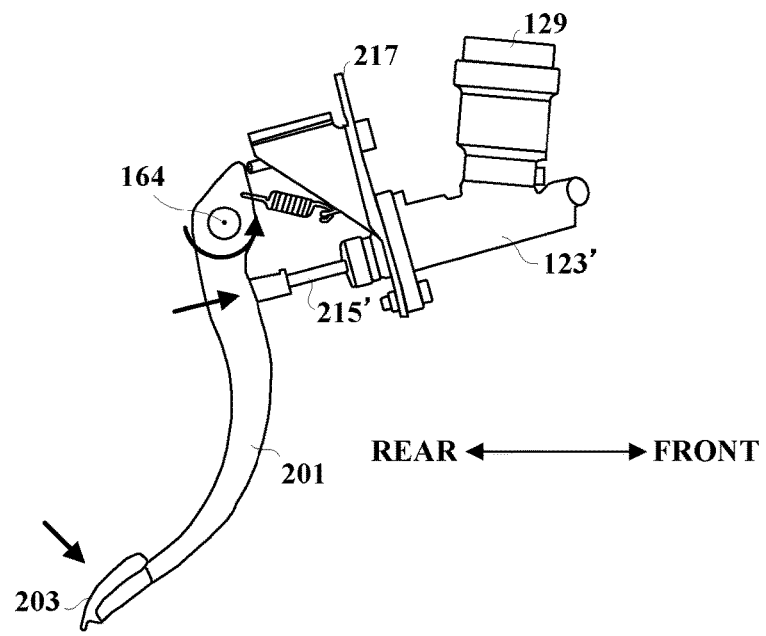
FIG. 16A is a side view illustrating a motion of the yoke rod of the brake master cylinder.
Figure 16B:
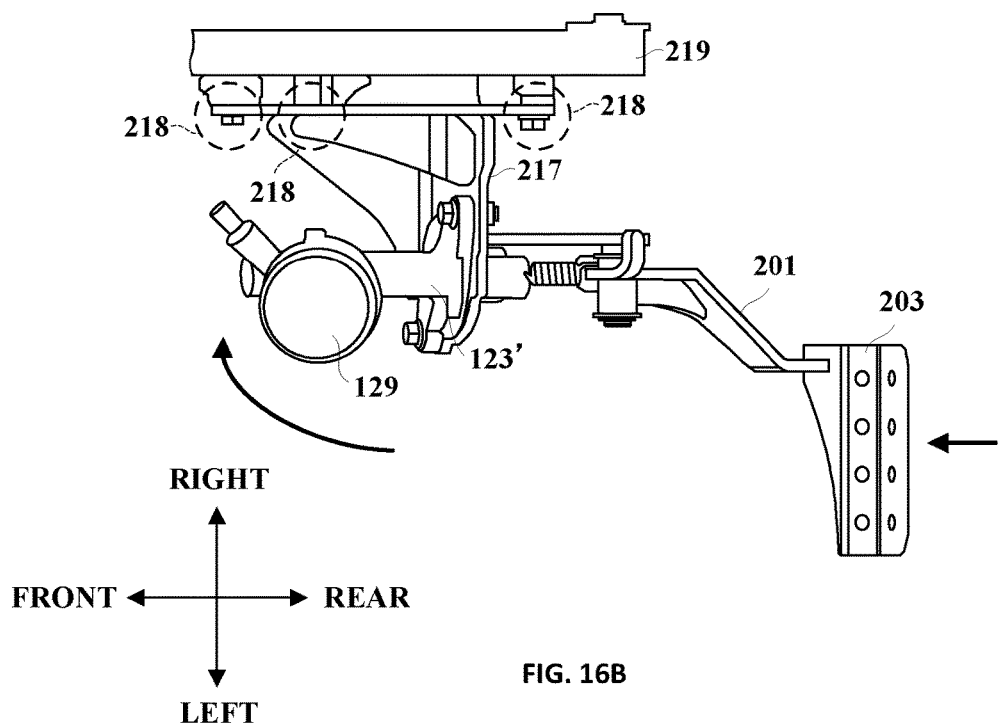
FIG. 16B is a top view illustrating the motion of the yoke rod of the brake master cylinder.

By contrast, a motion of the yoke shaft in a case where the brake master cylinder 123 is disposed forward of the brake pedal 117 will be described with reference to FIGS. 16A and 16B. FIGS. 16A and 16B are a side view and a top view illustrating the motion of a yoke rod 215' of a brake master cylinder 123'. When the brake tread 203 is pressed down, the brake arm 201 will rotate forward about the brake pivot axis 164 to push the yoke rod 215' forward. Since the brake master cylinder 123' is disposed forward of the brake pedal 117, a bracket 217 which supports the brake master cylinder 123' cannot be connected to a frame 219 in the direction of the yoke shaft 215'. So, the bracket 217 is attached in three right-side connecting positions 218 thereof to the frame 219 with bolts or the like. Consequently, since the bracket 217 receives a force of stepping on the brake tread 203 forward, in an obliquely rightward bending direction, a distortional force occurs to the bracket 217 and frame 219 supporting the pedal unit 17', such that the bracket 217 and frame 219 are easily subjected to bending.

According to the structure of the first preferred embodiment described above, since the pedal unit 17 is fastened to the cross member 38 of the frame 7 in the direction to receive the load of the yoke rod 215 of the brake master cylinder 123, bending of the cross member 38 is prevented.

Figure 17:
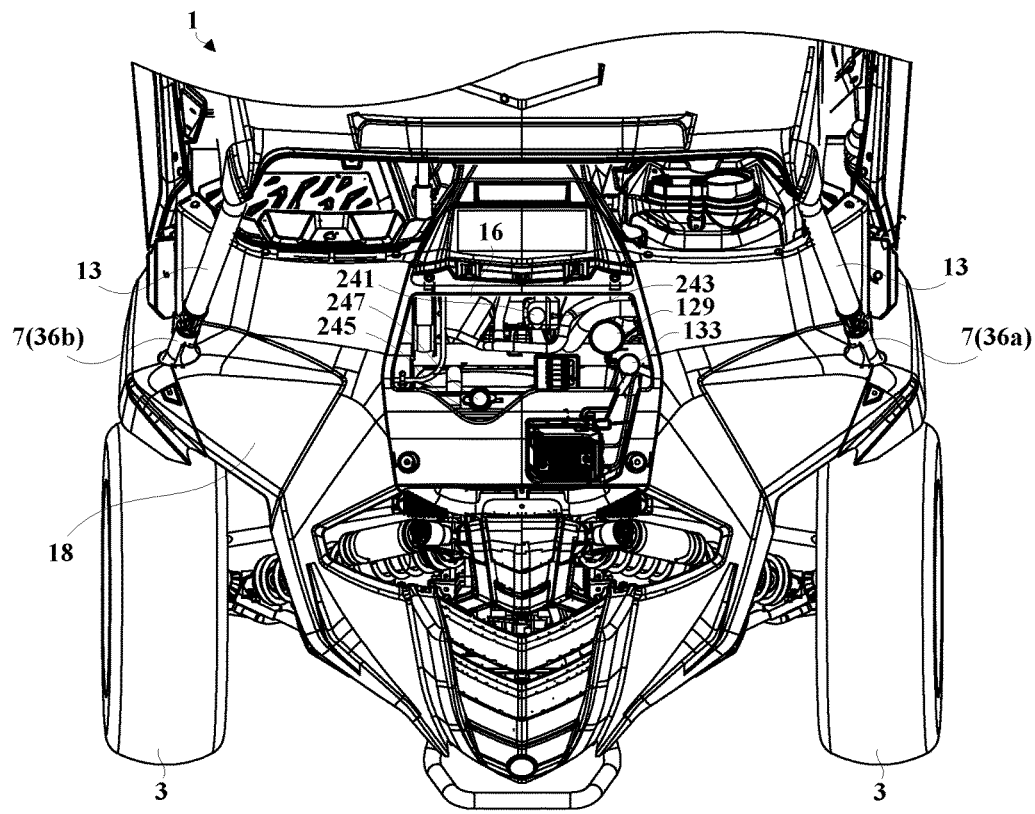
FIG. 17 is a fragmentary top view of the vehicle with a cover removed according to the first preferred embodiment of the present invention.
Figure 17:
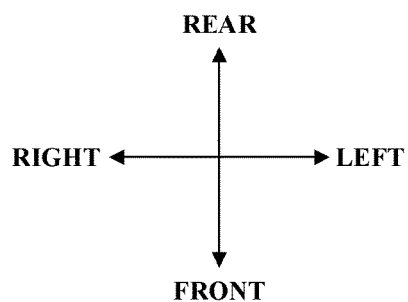

Next, a structure of the cover will be described with reference to FIGS. 1 and 17. FIG. 17 is a fragmentary top view of the vehicle 1 with the cover removed.

The vehicle 1 includes the body cover 18 fixed to the frame 7 and including an opening 16 therein, and the cover 19 attachable to and detachable from the body cover 18 to cover the opening 16. When the cover 19 is removed from the body cover 18, as shown in FIG. 17, the brake reservoir tank 129 is accessible via the opening 16. The body cover 18 corresponds to the first cover in a preferred embodiment of the present invention, and the cover 19 corresponds to the second cover in a preferred embodiment of the present invention.

The vehicle 1 includes a radiator 245 connected to a radiator reservoir tank 241 through an elastic pipe 243. The radiator reservoir tank 241 is accessible via the opening 16 of the body cover 18. A water inlet 247 that feeds cooling water into the radiator 245 is also accessible via the opening 16 of the body cover 18. Further, the clutch reservoir tank 133 is also accessible via the opening 16 of the body cover 18. Thus, only by removing the cover 19 from the body cover 18, access is made through the opening 16 to the brake reservoir tank 129, clutch reservoir tank 133, radiator reservoir tank 241, and the inlet 247 thus improving maintainability.

According to the first preferred embodiment, the accelerator pedal 115 and the brake pedal 117 are attached to the plates 141 and 161 extending in the fore-and-aft direction, and not to plates extending in the width direction. The respective pedals are therefore supported by the first surface 147 and the second surface 149 of the plate 141 and the third surface 167 of the plate 161. Consequently, a right-left support range for the two pedals is compact without necessitating an extra space in the width direction.

The brake pedal 117 which is heavily subjected to both oil pressure and a weight load is supported by both the first bracket 111 and the second bracket 113.

Figure 18:
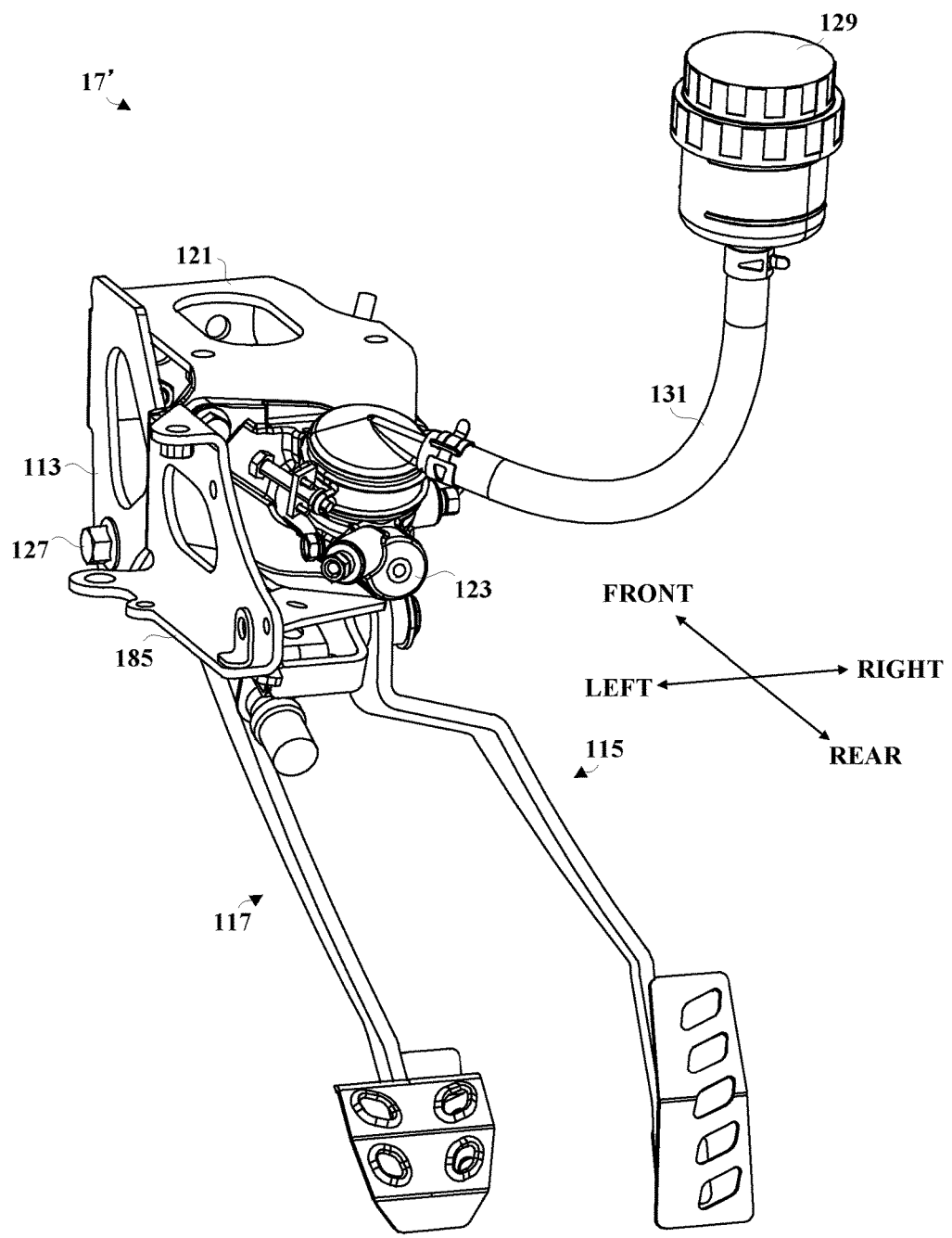
FIG. 18 is a left rear perspective view of a pedal unit according to a second preferred embodiment of the present invention.

Next, a pedal unit according to a second preferred embodiment of the present invention will be described with reference to FIG. 18. FIG. 18 is a left rear perspective view of the pedal unit according to the second preferred embodiment. In the second preferred embodiment, the elements shown with the same reference characters as the reference characters shown in the first preferred embodiment are the same as in the first preferred embodiment and will not be described again. The structures of the vehicle and pedal unit other than those described hereinafter are the same as in the first preferred embodiment.

A feature of a pedal unit 17' in the second preferred embodiment is that the components relating to the clutch pedal 119 are removed from the pedal unit 17 in the first preferred embodiment. That is, the vehicle in the second preferred embodiment includes an automatic transmission, and so the clutch pedal 119 is unnecessary. In the second preferred embodiment, therefore, only the accelerator pedal 115 and the brake pedal 117 are used. Compared with the pedal unit 17 in the first preferred embodiment, the pedal unit 17' in the second preferred embodiment does not have the clutch pedal 119, the clutch master cylinder 125, the shaft 171, the clutch reservoir tank 133, or the elastic pipe 135.

Thus, according to the second preferred embodiment, the vehicle 1 including an automatic transmission is provided with the pedal unit 17' that is compact in the right-left support range for the two pedals without necessitating an extra space in the width direction.

The present invention is not limited to the foregoing preferred embodiments, but may be modified as described in the following.

In the foregoing preferred embodiments, the vehicle 1 preferably includes one seat section 9, for example. Instead, the vehicle 1 may include a plurality of seat sections arranged in the fore-and-aft direction.

In the foregoing preferred embodiments, the vehicle 1 preferably includes one pair of rear wheels 5. Instead, the vehicle 1 may include two or more pairs of rear wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A pedal unit comprising:
   an accelerator pedal rotatable about a first pivot axis;
   a brake pedal rotatable about a second pivot axis;
   a first bracket including a first plate including a first surface and a second surface on a side opposite to the first surface and that supports the accelerator pedal adjacent to the first surface of the first plate to be rotatable about the first pivot axis, and that supports the brake pedal adjacent to the second surface of the first plate to be rotatable about the second pivot axis;
   a second bracket including a second plate including a third surface opposing the second surface and that supports the brake pedal adjacent to the third surface of the second plate to be rotatable about the second pivot axis;
   a connector held by the first plate and the second plate, and that rotatably supports the brake pedal in a state in which the brake pedal is disposed between the second surface of the first bracket and the third surface of the second bracket; and
   a shaft held by the first bracket and rotatably supporting the accelerator pedal.

2. The pedal unit according to claim 1, wherein the first surface of the first plate includes a surface that extends vertically or substantially vertically relative to the first pivot axis.

3. The pedal unit according to claim 1, wherein the second surface of the first plate includes a surface that extends vertically or substantially vertically relative to the second pivot axis.

4. The pedal unit according to claim 1, wherein the third surface of the second plate includes a surface that extends vertically or substantially vertically relative to the second pivot axis.

5. The pedal unit according to claim 1, wherein
   the accelerator pedal includes an accelerator pedal arm rotatable about the first pivot axis, and an accelerator tread supported by the accelerator pedal arm; and
   the accelerator pedal arm is connected to a lower portion of the accelerator tread adjacent to the brake pedal.

6. The pedal unit according to claim 1, wherein the brake pedal includes a brake pedal arm rotatable about the second pivot axis, a brake tread supported by the brake pedal arm, and a guide plate extending from a side surface of the brake tread located adjacent to the accelerator pedal toward a lower middle portion of the brake tread.

7. The pedal unit according to claim 1, wherein a center of the connector is located on the second pivot axis and extends along the second pivot axis.

8. The pedal unit according to claim 1, wherein a center of the shaft is located on the first pivot axis and extends along the first pivot axis.

9. The pedal unit according to claim 1, wherein the first bracket and the second bracket are connected by a connecting bracket.

10. The pedal unit according to claim 9, wherein the connecting bracket connects a rear portion of the first bracket to a rear portion of the second bracket.

11. The pedal unit according to claim 9, further comprising a brake master cylinder attached to the pedal unit through the connecting bracket.

12. The pedal unit according to claim 11, further comprising a brake reservoir tank connected to the brake master cylinder by an elastic pipe.

13. The pedal unit according to claim 1, further comprising a clutch pedal rotatable about a third pivot axis; wherein
the second plate includes a fourth surface on a side opposite to the third surface; and
the second bracket supports the clutch pedal adjacent to the fourth surface of the second plate to be rotatable about the third pivot axis.

14. The pedal unit according to claim 13, wherein
the clutch pedal includes a clutch pedal arm rotatable about the third pivot axis; and
the clutch pedal arm extends in a direction away from the brake pedal.

15. The pedal unit according to claim 13, wherein the brake pedal arm extends in a direction toward the accelerator pedal.

16. The pedal unit according to claim 13, further comprising a clutch master cylinder attached to the fourth surface of the second bracket.

17. The pedal unit according to claim 16, further comprising a clutch reservoir tank connected to the clutch master cylinder by an elastic pipe.

18. A vehicle comprising:
a pair of front wheels;
at least a pair of rear wheels;
a frame supported by the pair of front wheels and the pair of rear wheels;
a seat section supported by the frame and including seats arranged side by side;
a steering wheel disposed forward of the seat section;
a roll cage supported by the frame to cover an area above the seat section and the steering wheel; and
a pedal unit attached to the frame; wherein
the pedal unit includes:
an accelerator pedal rotatable about a first pivot axis;
a brake pedal rotatable about a second pivot axis;
a first bracket including a first plate including a first surface and a second surface on a side opposite to the first surface and that support the accelerator pedal adjacent to the first surface of the first plate to be rotatable about the first pivot axis, and that support the brake pedal adjacent to the second surface of the first plate to be rotatable about the second pivot axis;
a second bracket including a second plate including a third surface opposite to the second surface and that supports the brake pedal adjacent to the third surface of the second plate to be rotatable about the second pivot axis; and
a connector held by the first plate and the second plate, and that rotatably supports the brake pedal in a state in which the brake pedal is disposed between the second surface of the first bracket and the third surface of the second bracket; and
a shaft held by the first bracket and rotatably supporting the accelerator pedal.

19. The vehicle according to claim 18, further comprising:
a first cover fixed to the frame and including an opening therein; and
a second cover attachable to and detachable from the first cover to cover the opening in the first cover; wherein
the first bracket and the second bracket are connected by a connecting bracket;
the pedal unit includes a brake master cylinder attached to the pedal unit through the connecting bracket, and a brake reservoir tank connected to the brake master cylinder by an elastic pipe; and
the brake reservoir tank is accessible via the opening of the first cover.

20. The vehicle according to claim 18, further comprising a radiator connected to a radiator reservoir tank by an elastic pipe; wherein
the radiator reservoir tank is accessible via the opening of the first cover.

21. The vehicle according to claim 18, wherein
the pedal unit includes a connecting bracket that connects the first bracket and the second bracket, and a brake master cylinder attached to the pedal unit through the connecting bracket; and
the brake master cylinder is disposed farther rearward of the vehicle than the second pivot axis.

22. The vehicle according to claim 21, wherein the pedal unit is fastened to the frame in a direction to receive a load acting in a direction of a yoke rod of the brake master cylinder.

23. A pedal unit comprising:
an accelerator pedal rotatable about a first pivot axis;
a brake pedal rotatable about a second pivot axis;
a first bracket including a first plate including a first surface and a second surface on a side opposite to the first surface and that supports the accelerator pedal adjacent to the first surface of the first plate to be rotatable about the first pivot axis, and that supports the brake pedal adjacent to the second surface of the first plate to be rotatable about the second pivot axis;
a second bracket including a second plate including a third surface opposing the second surface and that supports the brake pedal adjacent to the third surface of the second plate to be rotatable about the second pivot axis; and
a connector held by the first plate and the second plate, and that rotatably supports the brake pedal in a state in which the brake pedal is disposed between the second surface of the first bracket and the third surface of the second bracket; wherein
the brake pedal includes a brake pedal arm rotatable about the second pivot axis, a brake tread supported by the brake pedal arm, and a guide plate extending from a side surface of the brake tread located adjacent to the accelerator pedal toward a lower middle portion of the brake tread.

24. A vehicle comprising:
a pair of front wheels;
at least a pair of rear wheels;
a frame supported by the pair of front wheels and the pair of rear wheels;
a seat section supported by the frame and including seats arranged side by side;

a steering wheel disposed forward of the seat section;
a roll cage supported by the frame to cover an area above the seat section and the steering wheel; and
a pedal unit attached to the frame; wherein
the pedal unit includes:
an accelerator pedal rotatable about a first pivot axis;
a brake pedal rotatable about a second pivot axis;
a first bracket including a first plate including a first surface and a second surface on a side opposite to the first surface and that support the accelerator pedal adjacent to the first surface of the first plate to be rotatable about the first pivot axis, and that support the brake pedal adjacent to the second surface of the first plate to be rotatable about the second pivot axis;
a second bracket including a second plate including a third surface opposite to the second surface and that supports the brake pedal adjacent to the third surface of the second plate to be rotatable about the second pivot axis; and
a connector held by the first plate and the second plate, and that rotatably supports the brake pedal in a state in which the brake pedal is disposed between the second surface of the first bracket and the third surface of the second bracket; wherein
the brake pedal includes a brake pedal arm rotatable about the second pivot axis, a brake tread supported by the brake pedal arm, and a guide plate extending from a side surface of the brake tread located adjacent to the accelerator pedal toward a lower middle portion of the brake tread.

25. A vehicle comprising:
a pair of front wheels;
at least a pair of rear wheels;
a frame supported by the pair of front wheels and the pair of rear wheels;
a seat section supported by the frame and including seats arranged side by side;
a steering wheel disposed forward of the seat section;
a roll cage supported by the frame to cover an area above the seat section and the steering wheel; and
a pedal unit attached to the frame; wherein
the pedal unit includes:
an accelerator pedal rotatable about a first pivot axis;
a brake pedal rotatable about a second pivot axis;
a first bracket including a first plate including a first surface and a second surface on a side opposite to the first surface and that support the accelerator pedal adjacent to the first surface of the first plate to be rotatable about the first pivot axis, and that support the brake pedal adjacent to the second surface of the first plate to be rotatable about the second pivot axis;
a second bracket including a second plate including a third surface opposite to the second surface and that supports the brake pedal adjacent to the third surface of the second plate to be rotatable about the second pivot axis; and
a connector held by the first plate and the second plate, and that rotatably supports the brake pedal in a state in which the brake pedal is disposed between the second surface of the first bracket and the third surface of the second bracket; wherein
the pedal unit includes a connecting bracket that connects the first bracket and the second bracket, and a brake master cylinder attached to the pedal unit through the connecting bracket; and
the brake master cylinder is disposed farther rearward of the vehicle than the second pivot axis.

26. A pedal unit comprising:
an accelerator pedal rotatable about a first pivot axis;
a brake pedal rotatable about a second pivot axis;
a first bracket including a first plate including a first surface and a second surface on a side opposite to the first surface and that supports the accelerator pedal adjacent to the first surface of the first plate to be rotatable about the first pivot axis, and that supports the brake pedal adjacent to the second surface of the first plate to be rotatable about the second pivot axis;
a second bracket including a second plate including a third surface opposing the second surface and that supports the brake pedal adjacent to the third surface of the second plate to be rotatable about the second pivot axis; and
a connector held by the first plate and the second plate, and that rotatably supports the brake pedal in a state in which the brake pedal is disposed between the second surface of the first bracket and the third surface of the second bracket; wherein
the pedal unit includes a connecting bracket that connects the first bracket and the second bracket, and a brake master cylinder attached to the pedal unit through the connecting bracket; and
the brake master cylinder is disposed farther rearward of the vehicle than the second pivot axis.

\* \* \* \* \*